July 27, 1937.    L. C. BLOMSTROM    2,087,896
ADJUSTABLE LIMIT GAUGE
Filed Jan. 22, 1936

Lowell C. Blomstrom
INVENTOR

BY Swan Inge and Hardesty
ATTORNEYS.

Patented July 27, 1937

2,087,896

UNITED STATES PATENT OFFICE 2,087,896

ADJUSTABLE LIMIT GAUGE

Lowell C. Blomstrom, Pleasant Ridge, Mich., assignor to Federal Mogul Corporation, Detroit, Mich., a corporation of Michigan Application January 22, 1936, Serial No. 60,252

4 Claims. (Cl. 33—178)

This invention relates to a device for measuring the bearing aperture portion of a connecting rod which has under use become distorted from true circularity, and has for its object an improved device of this character adapted to enable the user to quickly ascertain whether or not this portion of a connecting rod is available for re-use after a new bearing shell has been inserted, without wasting of time and material upon an article which when refinished would not be of satisfactory character.

Bearing surfaces of a very appreciable proportion of connecting rods installed in engines are found to wear out long before the engine of which the connecting rod is a part has reached the end of its usefulness, and it is a part of the service rendered by a large number of garages and repair shops to carry on hand substitute connecting rods, and in ascertaining the total of the bill, to make allowance for the connecting rods turned in, since a large proportion of them, so far as the connecting rod structure is concerned, are just as good as ever, and are turned back for reboring of the bearing aperture, followed by the installation of a new bearing shell. When connecting rods leave the factory, either as new articles or as rebored and relined connecting rods, their bearing apertures are required to be round within a tolerance of a half-thousandth of an inch, and many retain this true circularity even after long usage. The ascertainment of this condition as to the still undistorted connecting rods, as well as the catching of such rods as under long and severe usage have become distorted, is the purpose of the apparatus here dealt with. If perfect new bearings are installed in out-of-round bores, they do not correct the rod condition, but merely duplicate the rod distortion on the inside diameter of the bearing.

A indicates the bearing bore end of a connecting rod, and B the removable bearing shell or sleeve positioned therein; both the bore and the bearing sleeve should be of true circularity within the indicated half-thousandth of an inch tolerance. The shell C of the indicator is provided with a bore D at one end, within which the gauge E is mounted. As brought out particularly in Figures 1 and 3, the straight portion of the shell C is apertured or slotted from top to bottom, and lengthwise thereof engages a manually operable screw F, one end of which, as G, is knurled for manual actuation, while the other end acts upon the gauge E to move its arrow E', the degree thereof being indicated by the registry of the arrow E' with the several markings on the dial. From the bottom of the shell C there project two fixed pins, as I and K, while a movable pin H supported in the body H', is actuatable lengthwise of the shell C by the screw F, along which it can be locked in position by the action of the knurled jam nut J.

The screw shaft F is normally and yieldingly held in retracted position relatively to the gauge by the spring M, which acts against the washer N, the body of the screw F at the points F'' and F² being smoothed, and corresponding bearing apertures in the shell C being provided so that the screw F will freely rotate within the shell C, and when pressed lengthwise thereof against the pressure of the spring M, the attenuated tip F³ will actuate the gauge accordingly.

Figure 1:
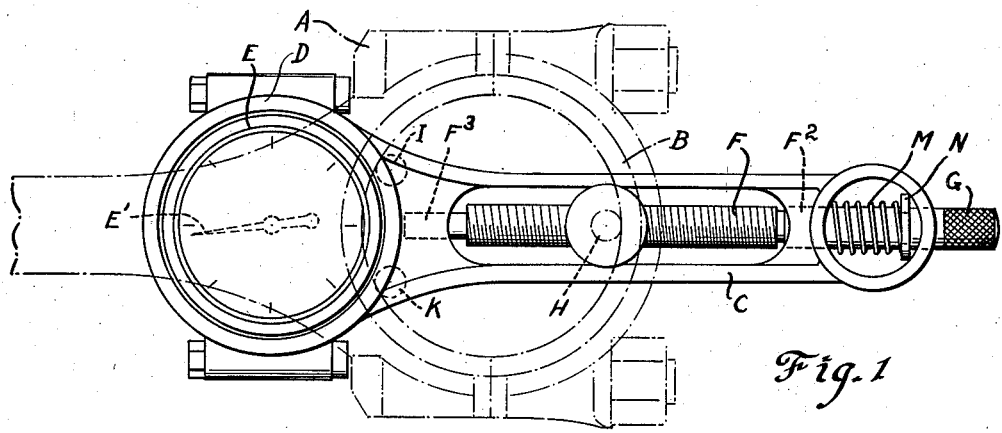
Figure 1 is a plan view showing my preferred form of apparatus in position relatively to the bearing bore of a connecting rod.
Figure 2:
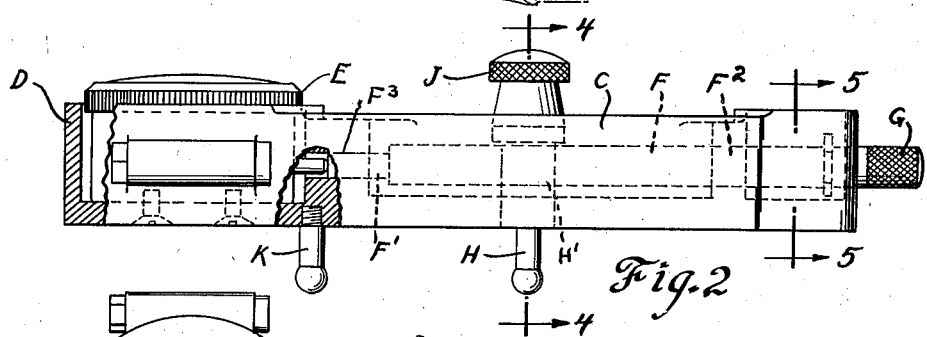
Figure 2 is a side elevational view.
Figure 3:
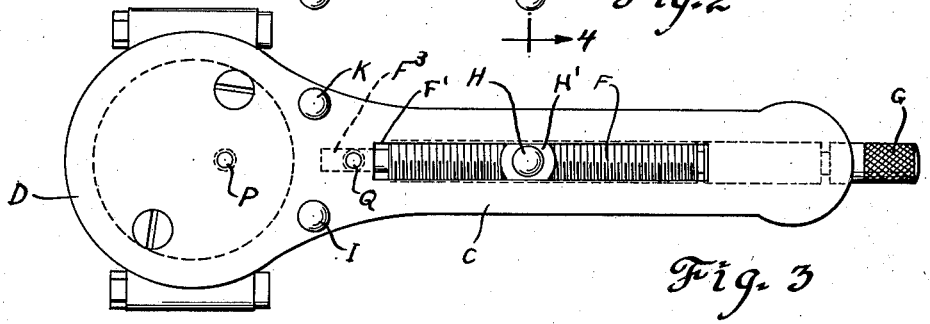
Figure 3 is a plan view from beneath, showing the outline of the shell of the indicator when positioned relatively to a connecting rod bore.
Figures 4, 5:
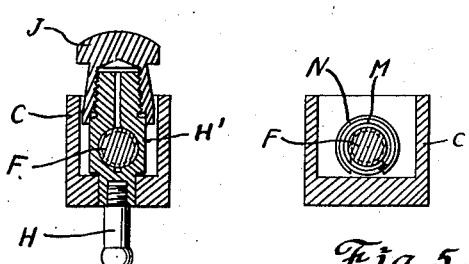
Figure 4 is a sectional elevation taken along the line 4—4 of Figure 2 and looking in the direction of the arrows there shown.
Figure 5 is a similar sectional elevational view taken along the line 5—5 of Figure 2 and looking in the direction of the arrows there shown.

It will be noted from the showing in Figures 1 and 3 particularly that the preferred contouring of the indicator shell is in the form of a connecting rod as viewed in plan. This not only lends itself to appropriate positioning and cooperation of the parts, but as well is desirable in the matter of suggestive identification of its intended use.

The device being placed with its gauge portion over the connecting rod A and with the pin H projected lengthwise of the shell and of the screw F so that all three will loosely fit within the bearing's inner periphery, the knurled end G of the screw is then turned to draw the block H' and its supported pin H away from the pins I and K until the pin H as well is in contact with the bore surface. The turning of the screw F is continued until the hand or arrow on the indicator shows a movement of .010 of an inch. The jam nut J is then tightened. This provides a three-point bearing contact against the bearing surface by the pins H, I, and K, and the position of the testing apparatus as described, that is, in alignment with the shank of the connecting rod, being accepted as standard and satisfactory, the problem then is to ascertain whether readings taken at other angles of the test device relatively to the connecting rod shank are uniform therewith. To this end at least six readings are recommended, one in the position described, one with the position of the gauge shell exactly 180° from the initial position, and two intermediate readings on either side of the lengthwise diametrical line of the bearing bore as thus determined, that is to say, at 60° intervals from one another. Accurate readings cannot be had by merely rotating the instrument in the bore after first seating the movable pin H in the described position relatively to the fixed pins I and K. After each position reading the movable block H' carrying the pin H should be released relatively to the screw F, and the described repositioning thereof in each of the six recommended positions gone through with, in the manner already described. In the event that any of these show a screw-stem actuated movement of the gauge arrow in excess of the half-thousandth inch tolerance, it is a definite and reliable indication that the bore of the connecting rod under test has been so distorted that its bearing relining is not worth proceeding with.

It will be noted that on Fig. 3 possible substitute fixed pin positions are indicated at P and Q. These are for extending the range capacity of the device as regards the diameter of the bearing bore to be measured, which, in the device preferably used, may be as great as four-and-a-quarter inches. Conversely, in case the two fixed pins, as for example I and K, be removed, and one fixed at Q the movable pin H can be projected so far toward it, lengthwise of the shell C, that holes of as small a diameter as five-eighths of an inch can be measured, and if the pin is changed from hole Q to P, it will permit bore measurement as great as three-and-three-quarters of an inch.

Of course when only one fixed pin is used cooperatively with the movable pin on the screw stem, instead of a three-point contact with the interior of the bearing surface being sought, the two pins then in use must be so spaced from one another that they touch the concaved bearing surface at exactly diametrically opposite points, so that they are at the maximum distance from one another which the size of the bearing permits when the pins are inserted therewithin.

Of course the utility of this device should not be considered as restricted to the measurement of connecting rod bearing bores alone. It is similarly useful for the measurement of any interiorly peripheral surface where minute fractions of an inch variance from true circularity are of importance, or for successively measuring the correspondence or otherwise of a quantity of articles of a specified kind with a calipered and accepted model piece.

What I claim is:

1. A device for gauging linear distances, comprising an elongated and chambered casing, a gauge fixedly mounted in one end thereof, and means for operating said gauge including a thrust member carried by and projecting from the gauge longitudinally of and within the casing, a screw shaft rotatable and bodily slidable in the casing, said movements of the screw shaft being independent, and the shaft being arranged in axial alignment with said thrust element and engageable therewith to operate the gauge, spring means yieldably urging said screw shaft axially away from said thrust element and normally maintaining the same out of engagement, abutment means fixedly carried by the casing and projecting laterally therefrom, a traveler mounted upon and meshing with the screw shaft and slidably but non-rotatably mounted in the casing, a traveling abutment carried by said traveler in cooperative relation to the fixed abutment means, means for locking the traveler to the screw shaft and holding the latter against rotation without interfering with free slidability of said screw shaft and traveler as a unit, means for turning the screw shaft when not so locked, to vary the initial position in which the traveler is yieldably held without moving the screw shaft longitudinally, whereby subsequent axial movement of the screw shaft imparted through said traveling abutment may be transmitted through said shaft to the thrust element and indicated by the gauge.

2. A device for gauging a plurality of angularly diverse internal diametrical measurements, comprising an elongated casing having a slideway portion, a screw shaft extending in parallel relation to said slideway portion, said screw shaft being rotatable and bodily slidable in the casing, a traveler meshing with said screw shaft and slidably mounted to be guided by said slideway portion, the screw shaft being bodily movable by the traveler, spring means yieldably urging said screw shaft and the traveler longitudinally into position of temporary non-engagement with the indicating element, means for rotating the screw shaft without changing its longitudinal position to move the traveler longitudinally of the slideway portion, an abutment portion carried by the traveler, means for locking the traveler and so said abutment to the shaft, fixed abutment means carried by the casing, the abutment portion carried by the traveler being movable toward and from the fixed abutment means, and a multiplying indicator carried by the casing and having an actuating portion operatively engageable by the screw shaft upon bodily longitudinal movement of the latter.

3. A gauging device as set forth in claim 2 in which said slideway portion includes a slotted section of the casing which houses at least a portion of the screw shaft, the traveler being longitudinally slidable and held against rotation therein otherwise induced by either axial or rotative movement of the screw shaft, and means carried by the traveler for restraining the screw shaft from rotation without interfering with sliding movement of the screw shaft and traveler as a unit.

4. In combination with a frame member, a gauge positioned in one end thereof, a screw member rotatably supported lengthwise of said frame and capable of limited movement lengthwise thereof and adapted to operatively contact said gauge with its adjacent end, a spring for yieldably opposing the induced lengthwise movement of said screw member, a stud-carrying cage positioned on said screw-member and limitedly actuable lengthwise of said frame by either axial or rotative movement of the screw member, and a fixed stud member carried by said frame and adapted to be positioned, with said cage-supported stud, against diametrically opposing points upon the walls of a bored recess whose measurement is desired, the resultant degree of displacement of said screw member from its normal position on said frame due to the pressure thereon exerted by said cage supported stud, incident to engagement of said stud with the work, being indicated on said gauge accordingly.

LOWELL C. BLOMSTROM.